UNITED STATES PATENT OFFICE 1,961,397

PREPARING OF A NEW CONDENSATION PRODUCT FROM META-CRESOL AND ACETONE

Walter Schoeller, Berlin-Charlottenburg, Hans Jordan, Berlin-Steglitz, and Reinhard Clerc, Berlin, Germany, assignors to Schering-Kahlbaum A.-G., Berlin, Germany No Drawing. Application June 22, 1928, Serial No. 287,639. In Germany July 14, 1927

7 Claims. (Cl. 260—64)

Our invention refers to a new condensation product from meta-cresol and acetone having particularly valuable properties as a starting material for the manufacture of odorants and disinfectants such as menthol and thymol. It further includes the process of making same.

According to our invention a new condensation product, which has the empirical formula $C_{17}H_{20}O_2$, and in which both of the oxygen atoms are present as hydroxyl groups, is obtained by effecting the condensation of meta-cresol and acetone under the following working conditions.

In carrying out the invention the condensation is effected at room temperature, care being taken that substantially no rise in temperature due to spontaneous generation of heat takes place, for example, by cooling or by employing a small concentration of the condensing agent or by diluting with a suitable solvent.

The new condensation product can in all probability be assigned the formula

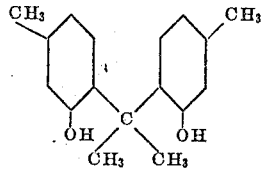

and is therefore 4,4'-dimethyl-2,2'-dihydroxy-diphenyl-dimethyl methane.

It is advantageous to introduce an agent into the reaction mixture for combining with water, or to employ a condensation agent which itself is capable of combining with the water produced in the reaction. By this means it is possible to conduct the reaction further and essentially to increase the yield of the new compound, whereas under milder conditions the reaction ceases after some time on account of dilution with the reaction water. As agents for combining with the water the customary drying agents for organic solvents may be used in so far as they do not react with meta-cresol under the conditions of the reaction and are insoluble in acetone. Acid anhydrides can also be employed. As condensation agents for use in carrying the invention into effect, phosphorous oxychloride can be employed, for example, or anhydrous metallic chlorides, such as aluminum chloride.

According to a further modification the condensation is effected at an even lower temperature, for example, by strongly cooling with ice or a freezing mixture.

Furthermore, in the application of gaseous hydrochloric acid it is suitable to saturate the components to be condensed separately with gaseous hydrochloric acid and then to cool strongly and to carry out the mixing at this point.

By these reaction conditions a considerable increase of the yield can be obtained.

Each of the following examples illustrates how our invention may be carried out to obtain the new condensation product hereinbefore described.

Example 1

Acetone and a small excess of meta-cresol are saturated at room temperature with gaseous hydrochloric acid and any spontaneous heating is repressed by careful cooling. After standing for several hours the hydrochloric acid is washed out with water. The new compound crystallizes on cooling from the excess of meta-cresol and after recrystallization from alcohol it has the melting point 131–132°; the diacetyl derivative of this compound after repeated crystallization from very dilute alcohol has a melting point of 84–85°.

Example 2

Into a mixture of acetone and meta-cresol, of which latter there is a slight excess, 2% of its weight of gaseous hydrochloric acid is passed. After standing for several hours at room temperature the hydrochloric acid is washed out and the excess of meta-cresol is distilled off in vacuum. A compound remains which solidifies with the formation of crystals and which is identical with that obtained according to Example 1.

Example 3

Molecular quantities of meta-cresol and acetone are saturated with gaseous hydrochloric acid with cooling and then an excess of anhydrous magnesium sulphate is added and the whole maintained for several hours at 0–10° with brisk stirring. A thick magma is produced which, after washing out the hydrochloric acid and the magnesium sulphate, solidifies in crystals.

Example 4

Molecular quantities of meta-cresol and acetone are treated with cooling and stirring with a slight excess of phosphorous oxychloride. After stirring for several hours in the cold the separation of the new compound commences. The working up is effected as described in Example 3.

Example 5

Acetone and a small excess of meta-cresol are saturated, whilst cooling to 0 to −5°, with gaseous hydrochloric acid and this temperature is maintained for several hours with stirring. After washing out the hydrochloric acid with water the residue solidifies to a crystal mass from which the new compound is separated.

*Example 6*

Acetone (1 mol.) and meta-cresol (2 mols.) are separately saturated with gaseous hydrochloric acid, then strongly cooled and mixed together. The working up is effected as described in Example 5.

*Example 7*

Acetone (1 mol.) and meta-cresol (2 mols.) are saturated with gaseous hydrochloric acid with strong cooling and then an excess of anhydrous magnesium sulphate is added, and the temperature maintained below 0° with stirring. The working up is effected as described in Example 5.

Various changes can be made in the details described in the foregoing specification without departing from the invention or sacrificing the advantages thereof.

We claim:—

1. The product of condensation from meta-cresol and acetone having probably the formula:

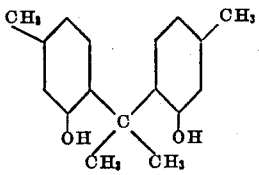

crystallizing in colorless crystals of the melting point 131–132° C. and yielding a diacetyl derivative melting at 84–85° C.

2. The process of producing 4,4'-dimethyl-2,2' dihydroxy-diphenyl-dimethylmethane comprising reacting on a meta-cresol with acetone at a temperature not exceeding room temperature in the presence of acidic condensing agents selected from a group consisting of hydrochloric acid and the chlorides of inorganic acids.

3. The process of producing 4,4'-dimethyl-2,2' dihydroxy-diphenyl-dimethylmethane comprising reacting on a meta-cresol with acetone at a temperature not exceeding room temperature in the presence of acidic condensing agents selected from a group consisting of hydrochloric acid and the chlorides of inorganic acids and a water binding agent.

4. The process of producing 4,4'-dimethyl-2,2'-dihydroxy-diphenyl-dimethylmethane comprising reacting on a meta-cresol with acetone at a temperature at about 0° C. in the presence of hydrochloric acid.

5. The process of producing 4,4'-dimethyl-2,2'-dihydroxy-diphenyl-dimethylmethane comprising reacting on a meta-cresol with acetone at a temperature at about 0° C. in the presence of hydrochloric acid and a water binding agent.

6. The process of producing 4,4'-dimethyl-2,2'-dihydroxy-diphenyl-dimethylmethane comprising reacting on a meta-cresol with acetone at a temperature at about 0° C. in the presence of hydrochloric acid and anhydrous magnesium sulphate.

7. The process of producing 4,4'-dimethyl-2,2'-dihydroxy-diphenyl-dimethylmethane comprising separately saturating meta-cresol and acetone with gaseous hydrochloric acid, strongly cooling and then mixing them.

WALTER SCHOELLER.
HANS JORDAN.
REINHARD CLERC.